United States Patent [19]
Grandi

[11] Patent Number: 5,895,104
[45] Date of Patent: Apr. 20, 1999

[54] MOBILE DEVICE FOR PRESERVATION AND REHEATING WITH MOVABLE THERMAL BARRIERS AND CONSTANT LEVEL DISTRIBUTION OF HOT AND COLD MEAL-TRAYS

[76] Inventor: René Grandi, Via Marco 4, Campione D'Italia 22060, Italy

[21] Appl. No.: 08/945,759
[22] PCT Filed: Apr. 19, 1996
[86] PCT No.: PCT/FR96/00605
§ 371 Date: Nov. 7, 1997
§ 102(e) Date: Nov. 7, 1997
[87] PCT Pub. No.: WO96/35361
PCT Pub. Date: Nov. 14, 1996

[30] Foreign Application Priority Data
May 9, 1995 [FR] France ................... 95 05622

[51] Int. Cl.⁶ .................................................. A47J 39/00
[52] U.S. Cl. ..................... 312/403; 312/407; 312/407.1; 312/268
[58] Field of Search .................... 312/268, 267, 312/403, 405.1, 407, 407.1, 408, 236; 187/244, 255; 221/150 HC; 99/443 R, 386

[56] References Cited

U.S. PATENT DOCUMENTS

| | | | |
|---|---|---|---|
| 1,938,985 | 12/1933 | Starr | 312/268 X |
| 3,063,769 | 11/1962 | Graber et al. | 312/306 |
| 3,222,114 | 12/1965 | Stentz | 312/403 |
| 3,275,393 | 9/1966 | Stentz | 312/403 |
| 3,295,434 | 1/1967 | Wilhelm et al. | 99/443 R X |
| 3,311,434 | 3/1967 | Dyer et al. | 312/214 |
| 4,274,551 | 6/1981 | Hicks | 221/150 R X |
| 5,431,493 | 7/1995 | Larson | 312/268 |

FOREIGN PATENT DOCUMENTS

| | | | |
|---|---|---|---|
| 0161178 | 11/1985 | European Pat. Off. | |
| 2266864 | 10/1975 | France . | |
| 2386291 | 11/1978 | France . | |
| 2671950 | 7/1992 | France | 312/408 |
| 2684281 | 6/1993 | France . | |
| 3128286 | 2/1983 | Germany | 312/236 |
| 404286511 | 10/1992 | Japan | 312/236 |
| 2199022 | 6/1988 | United Kingdom | 312/236 |

*Primary Examiner*—Peter M. Cuomo
*Assistant Examiner*—David E. Allred
*Attorney, Agent, or Firm*—Greenblum & Bernstein, P.L.C.

[57] ABSTRACT

A mobile device for the preservation and reheating with movable thermal barriers and constant level distribution of hot and cold meal-trays. The device includes a housing having a mobile distributing column of meal-trays having a mobile articulated thermal barrier which supports the trays and lifts them up to a distribution door while separating the cold area from the hot area by effecting a rotation by means of a roller chain driven by pulleys actuated by a pedal crank gear mechanism. The device provides for the distribution of meal-trays at a constant level while providing for the reheating and preservation of hot and cold food dishes placed on the same meal-tray waiting to be distributed.

17 Claims, 4 Drawing Sheets

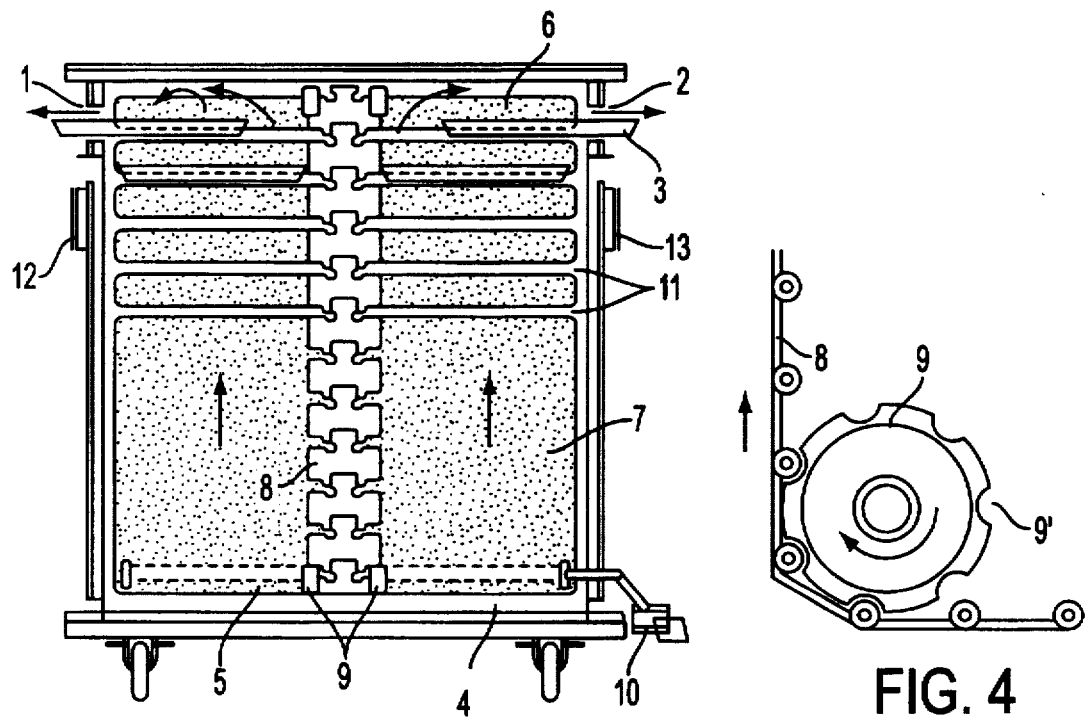
FIG. 1
FIG. 4
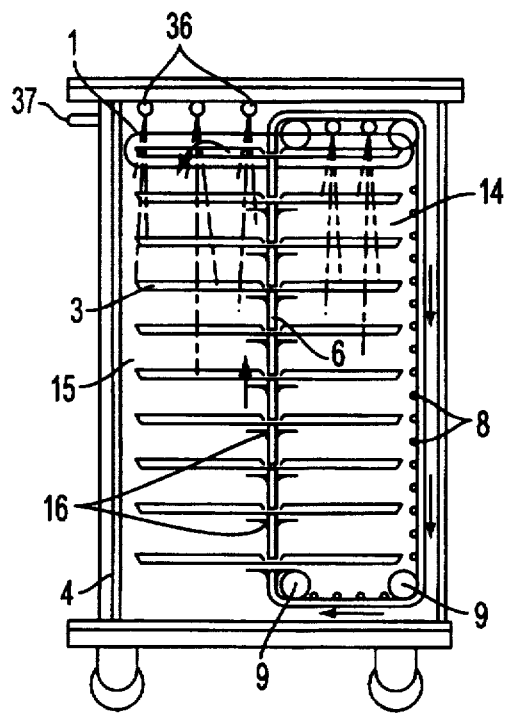
FIG. 2
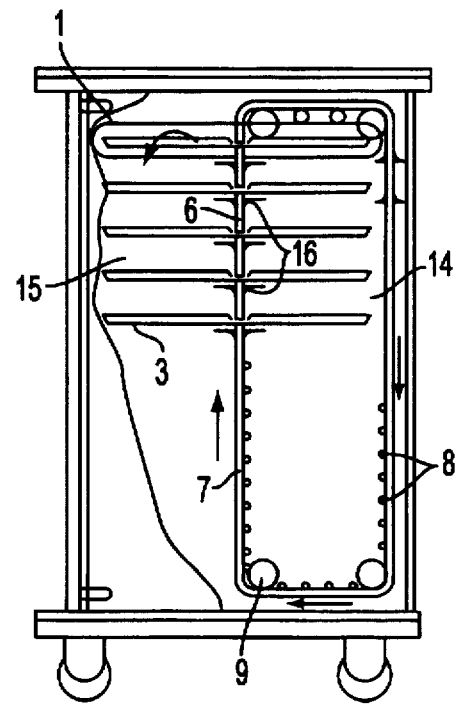
FIG. 3

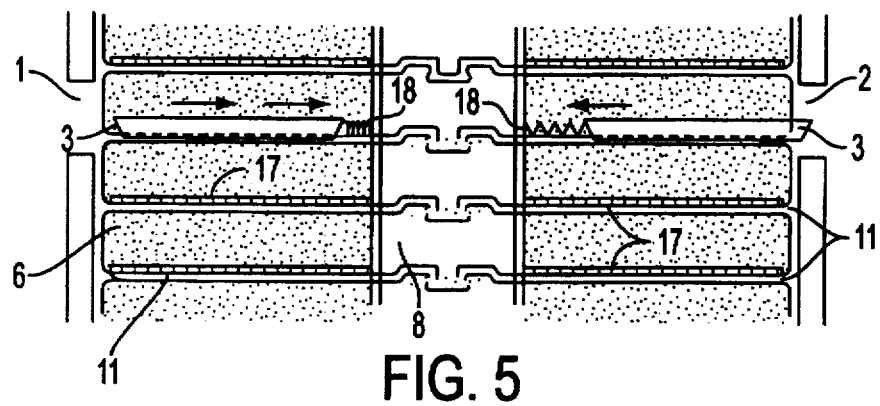
FIG. 5
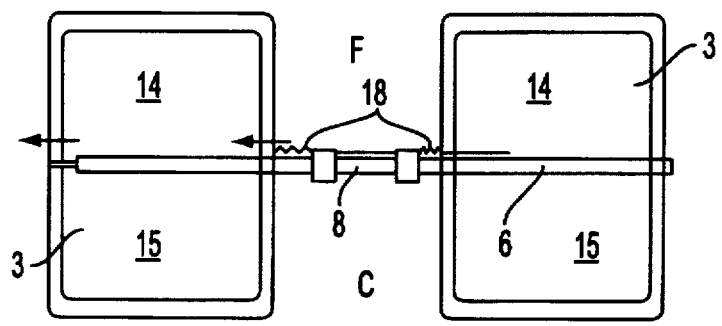
FIG. 6
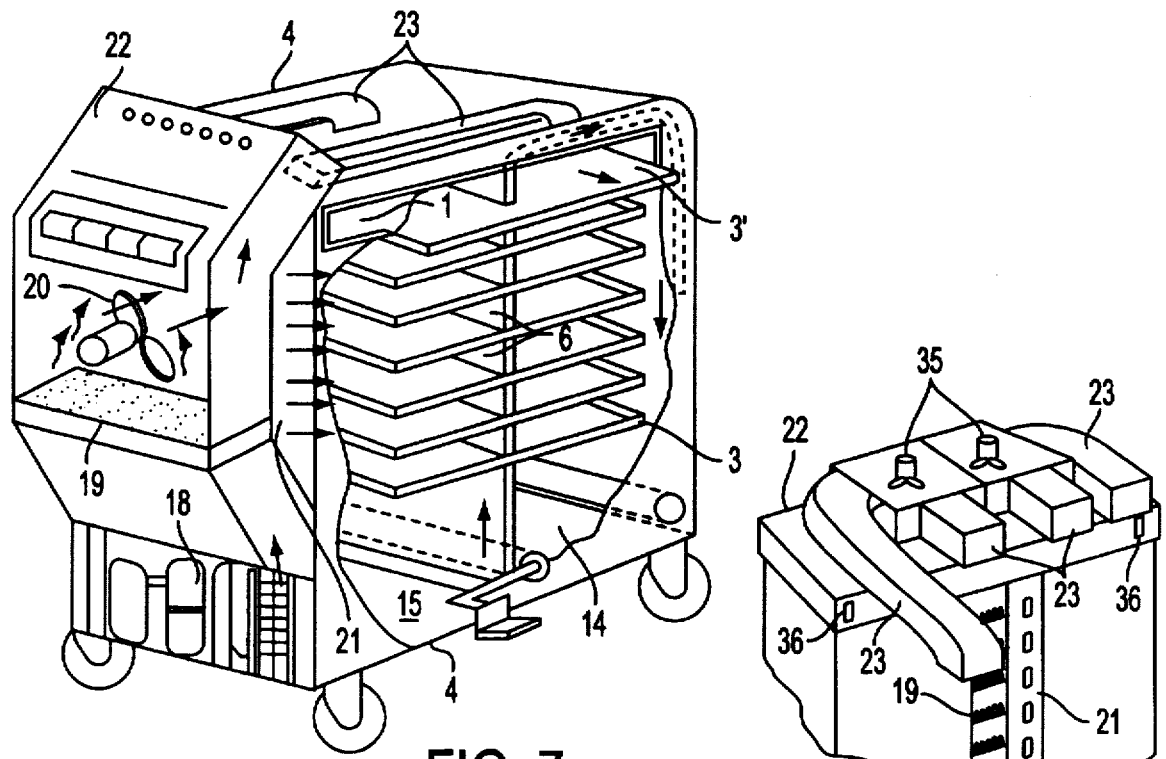
FIG. 7
FIG. 8

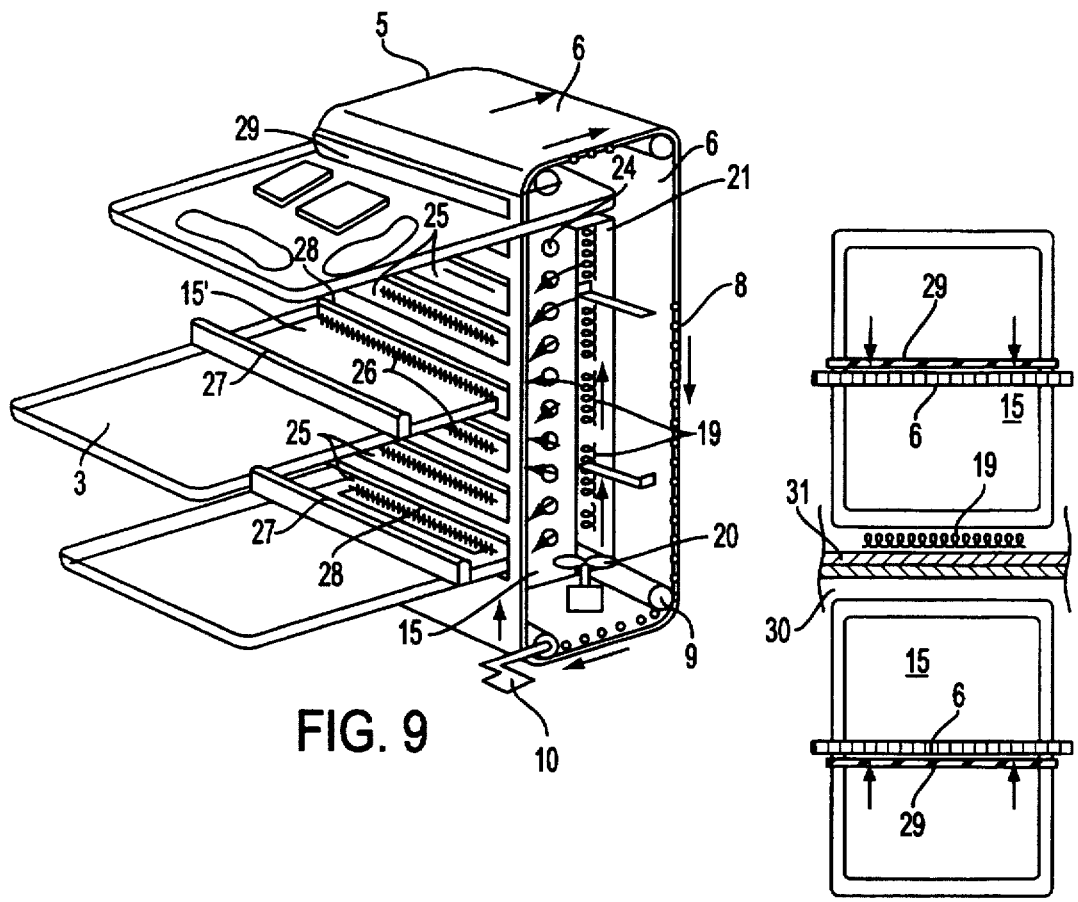
FIG. 9
FIG. 10
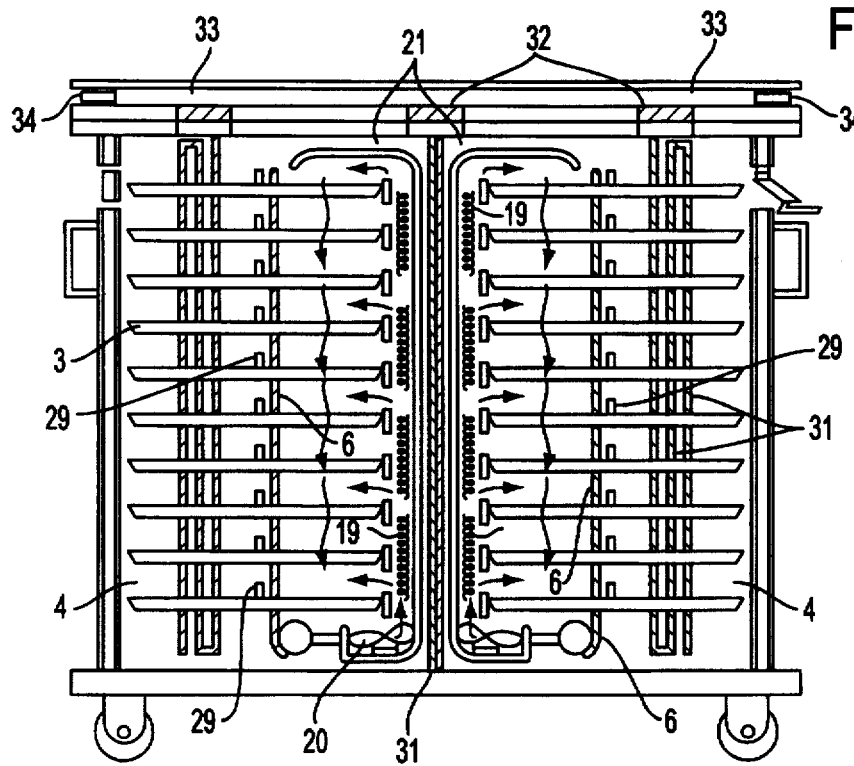
FIG. 11

MOBILE DEVICE FOR PRESERVATION AND REHEATING WITH MOVABLE THERMAL BARRIERS AND CONSTANT LEVEL DISTRIBUTION OF HOT AND COLD MEAL-TRAYS

BACKGROUND OF THE INVENTION

1. Field of the Invention

Mobile device for the preservation and reheating with movable thermal barriers and constant level distribution of hot and cold meal trays.

It is intended to allow the constant level distribution of meal-trays whilst also allowing the reheating and preservation of hot and cold food items placed on the same meal tray while awaiting distribution.

2. Description of Background and Relevant Information

Numerous refrigerated devices are known that comprise meal trays having a cold zone and a hot or reheating zone where they wait for their final distribution. These two zones require a thermal barrier which is often fixed and non-detachable. The traditional fixed stacking of the trays requires that they be introduced or removed by placing them or picking them up one by one from their stacking ladder. This forces the person handling the device into the uncomfortable position of having to bend down and rise up in order to reach the trays that have been placed lower or higher, and these manoeuverings are difficult to implement, especially when the space for displacement or movement is limited. In addition, the door of the device housing must be opened, each time that a tray is retrieved, and this causes substantial dispersions of the cooling and heating calories contained therein.

SUMMARY OF THE INVENTION

The device that is the object of the instant invention eliminates all these disadvantages; it allows for an easy distribution of the meal-trays that always arrive at a constant level, thus avoiding painstaking maneuvers on the part of the person handling the device, without there being any requirement to bend, since the distribution is done via a small door at the top of one or both sides of the housing. Since the opening only distributes one tray at a time, it is relatively small, and by definition, since cold air is heavier, it descends and remains confined in the housing, like the refrigerated shelves for frozen products in supermarkets that are not enclosed from the top.

As such, this device facilitates the distribution of meal-trays while also guaranteeing the maximum preservation of the food items contained in the refrigerated zone, by conserving the cooling and heating calories of each of the two zones.

The mobile housing can either be equipped with a refrigeration kit having a compressor, froster and "Carbo" or "Co2 gas" regulator, or it can comprise a reserve tank of refrigerated fluid which is distributed by heat exchanging tubes or it can be attached to a feeding terminal or module that distribute, via ventilation sheaths, the cooling as well as heating calories required for the refrigeration and reheating of the trays. The latter can also be heated individually by a thermal resistance located beneath each tray. A thermal barrier separates the cold zone from the hot zone; it is mobile and articulated; it comprises lateral openings, between which each tray is introduced, hermetically sealing the hot and cold zones. Catches fixed on the thermal barrier are used to stabilize and balance the trays.

The lateral openings comprise joints made of flexible rubber or rubberized naps; these are compressed during the introduction and in the presence of the trays, and regain their initial shape by closing the gap when the tray is removed, thus preventing the temperatures of the two zones from getting mixed. These joints are fixed by clips or by a "dove tailed" slide so as to be detached and cleaned on a daily basis.

In order to ensure the constant level distribution of the meal-trays, the assembly—meal trays and thermal barriers—is driven upwardly, up to the distribution door, by a rotational system, fixed on the thermal barrier or integral with said barrier.

This system, articulated at the same level as the thermal barrier, consists of a roller chain, made of plastic or otherwise, driven on pulleys by a pedal crank gear mechanism equipped with an anti-return pawl and geared down so as to drive, by a simple pressure of the foot, the assembly forming the distributing column, so as to bring each tray to a constant level and enable them to exit one after another.

The roller chain can also be driven by a back geared motor that could potentially actuate the wheels of the cart in order to make it move forward, a clutch enabling the desired function to be selected.

A compressed spring located on the chain releases the tray upon its arrival in front of the distribution door. Since the tray is only partially ejected, it can be grasped. Under the lowermost tray, the thermal barrier is extended by a hermetic curtain, that is clippable, detachable and washable, so as to always separate the two hot and cold zones; it also comprises the roller chain so as to allow the rotation of the entire assembly.

BRIEF DESCRIPTION OF THE DRAWINGS

This constant level system that has just been described represents one of the embodiments of the device, which can be envisioned with a single or dual distribution having common hot and cold zones; in the latter embodiment, the trays exit laterally from each side, thus providing simultaneous dual service.

However, another embodiment, depending on the volume requirements, can be envisioned, especially for airline carts wherein the distribution of trays can only be done on the front face and longitudinally with respect to the device. Thus the tray portion requiring heating penetrates from the front into the thermal barrier opening equipped with a rubberized joint or naps; the tray is equipped, over its entire width, with an abutment, comprising a solenoid that gets pressed against the thermal barrier, which is also magnetized, thus enabling the tray to get stabilized.

This arrangement neither changes nor prevents the driving, mobility or rotation of the thermal barrier.

For a device as per this embodiment, a central zone permits the reheating of the food by heat that is pulsed via ventilated resistances in a sheath equipped with holes directing the ventilation. This same zone, while awaiting heating, is refrigerated in an identical manner as is the permanent cold zone, depending on the type of refrigeration used, as has been cited hereinabove previously.

Regardless of the embodiment of the device, tray introduction is done via a service door located on the same side as the evacuation of the trays (lateral or frontal); it also allows for the manual cleaning and the interior verification of the means that are implemented.

As such, the trays could also be introduced in the same way that they are removed, but inversely. When the device is devoid of trays, nozzles connected via a rapid action hose coupling to a water or steam projection pressure pump, enables an easy, quick and extremely efficient clean up for the elimination of bacteria.

A transparent portion along the entire height of the device enables the visualization of the interior of the tray distributing column.

In the annexed drawings, provided as non-restrictive embodiment examples of the aim of the objection:

FIG. 1 is a frontal sectional view of the device with a double housing and a dual lateral distribution of the trays.

FIGS. 2 and 3 represent the same device as seen from a side view but where the tray level is at a different stage.

FIG. 4 is a detailed view of an embodiment of a roller chain driven by a pulley.

FIG. 5 shows a lateral view of the thermal barrier with its central mobile driving system.

FIG. 6 is a top view of the thermal barrier separating the two zones of the trays.

FIG. 7 is a perspective view of an embodiment of the device having a fixed or detachable module comprising the refrigeration and reheating elements.

FIG. 8 is a diagram showing the upper portion of the module with the ventilation conduits for the diffusion and recycling of the cooling calories along both zones of the housing.

FIG. 9 is a perspective view of an inner portion of the device with its distributing column comprising the thermal reheating elements and wherein the trays are introduced frontally.

FIG. 10 shows a top view of the longitudinal introduction of the trays.

FIG. 11 represents a front and sectional view of an entire device with dual housings and dual longitudinal distribution of the trays.

Figure 12:
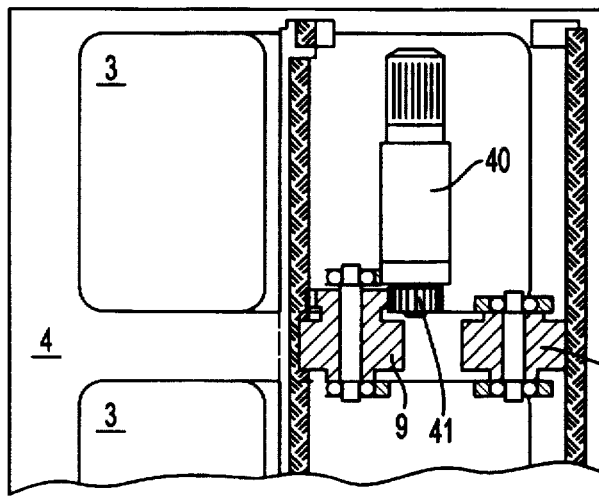

FIG. 12 is a schematic representation of a back geared motor driving the roller chain by means of a toothed gear.

Figure 13:
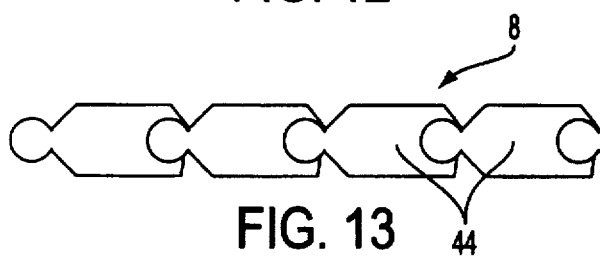

FIG. 13 represents a side view of the device as per the invention, equipped with a back geared motor that can drive either the roller chain, or the wheels of the mobile housing, by virtue of rubberized rollers.

Figure 14:
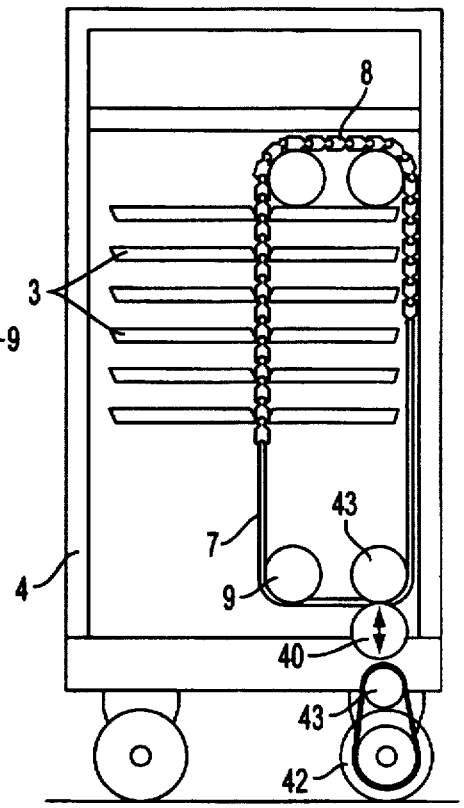

FIG. 14 is a detail showing the principle of a roller chain system with links that get nested into one another.

Figure 15:
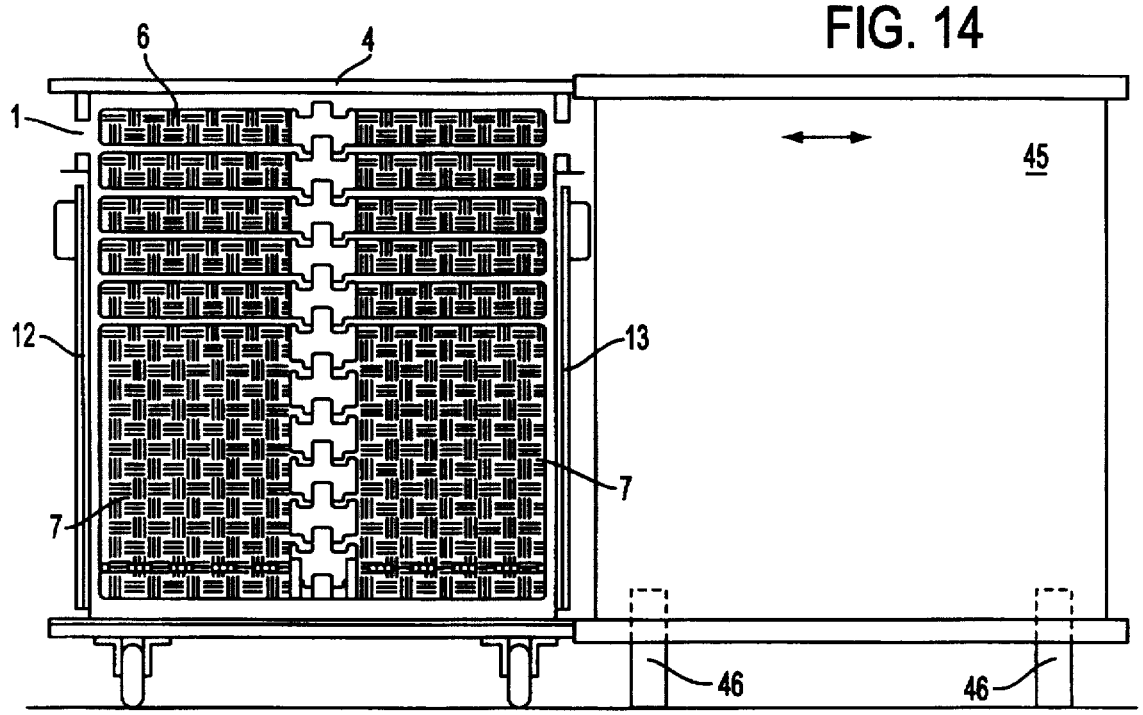

And FIG. 15 is a frontal view of a variation of the device comprising a sliding body so as to facilitate cleaning.

DETAILED DESCRIPTION OF THE INVENTION

The device of FIG. 1 is constituted of the dual lateral distribution 1 and 2 of the trays 3, introduced via the doors 12, 13. The distributing column 5 of the housing 4 comprises the thermal barrier 6 extended at the end of the rotation by the insulating curtain 7. At the center, the articulated roller chain 8 is driven by pulleys 9 by means of pedal crank gear mechanism 10. The thermal barrier is articulated for its rotation at the level of the openings 11 corresponding to the articulation of the chain 8; they also allow the introduction and sliding of the trays.

The thermal barrier 6 of FIGS. 2 and 3 separates the housing 4 and the trays 3 into two zones, one of which is the permanently refrigerated zone 14 and the other zone 15 is refrigerated while awaiting reheating at a later point. The stabilizing catches 16 for the trays are fixed on the thermal barrier 6. In FIG. 2, the housing 4 comprises trays 3 awaiting distribution via opening 1, the roller chain 8 which is maintained by the pulleys 9 is not geared to rotate. The nozzles 36 are connected to the rapid action hose coupling 37 for cleaning. In FIG. 3, the roller chain 8 has begun its rotation in order to evacuate the trays, the insulating curtain 7 separates the two zones 14, 15.

The roller chain 8 of FIG. 4 is driven by the serrated 9' pulley 9.

In FIGS. 5 and 6, the trays 3 are introduced between the thermal barrier 6 up to the level of the roller chain 8 and via openings 11 which comprise detachable joints 17. The springs 18 enable the ejection of the trays via the openings 1 and 2. The thermal barrier 6 of FIG. 6 insulates the cold zone 14(F) from the refrigerated zone awaiting reheating 15(C) of the trays 3.

A single housing 4 is presented in FIG. 7 with the thermal barrier 6 separating the two zones 14 and 15. The upper tray 3' is removed from one side alone and via the lateral opening 1, ready to be grasped.

The module 22 contains the refrigeration elements, in this case the compressor 18 and the ventilated 20 resistance heating means 19 through a sheath 21 up to the zone 15 at the moment that this portion of the tray is reheated. The conduits 23 are used to direct and recycle 23' the cooling calories in the refrigerated zone 14 and the zone 15 when it is awaiting reheating.

In FIG. 8, hooks 36 enable the assembly of the module 22 to the tray housing 4, for the transmission of the cooling calories via the conduits 23, that are present here in zone 15 while awaiting reheating, one of such conduits 23 being longer so as to reach the permanent refrigeration zone.

The conduits 23' enable the recycling of the cooling calories by suctioning them by turbines 35, the sheath 21 contains the heating elements 19 for heating the zone 15.

The distributing column 5 of FIG. 9 comprises the heating zone 15 with its sheath 21 equipped with resistances 19 and holes 24 for the diffusion of the ventilation 20. The thermal barrier 6 has openings 25 with joints or naps 26, between which the reheating portion 15' of tray 3 is introduced. Solenoids 27 and 28 or gripping systems are located on the abutment 29 of the tray and along the opening 25, allowing the tray to be maintained and stabilized, as well as providing a perfect insulation. The pedal crank gear mechanism 10 actuates the pulleys 9 driving the chain 8 so as to make the trays 3 rise by one row with the thermal barrier 6.

The trays 3 of FIG. 10 are introduced longitudinally and inversely, for a dual capacity and dual distribution; the abutment 29 is pressed against the thermal barrier 6. The central portion 30 adjusts the refrigeration in the heating zone 15; this is undertaken here via heat exchanging tubes or "caloducts" 31 and by heating the resistances 19 at the time of reheating.

In FIG. 11, the device comprises two housings 4, 4', in which the trays 3 are introduced longitudinally and these come into abutment against the thermal barrier 6 separating the zones 14 and 15. Each housing comprises its sheath 21 as well as the ventilated 20 resistances 19. The refrigeration is done here by means of "caloducts" 31 that conduct the captured cooling calories 32 (carbo or Co2 into module 33 and are introduced by the rapid action hose coupling 34.

If the pedal crank gear mechanism 10 is not efficient enough to actuate the roller chain 8 and make the trays 3 rise, the drive of this chain can be advantageously provided by a back geared motor 40 acting on one of the serrated pulleys 9 by means of a gear 41 for example, as has been shown in FIG. 12.

In FIG. 13, the back geared motor has a dual function—it drives the roller chain 8 in order to make the trays rise, and it also actuates the wheels 42 so as to enable the entire mobile housing to move forward. The motion selection is done via a manual clutch of the belt clutch type, or by the displacement of the back geared motor 40 acting according to its position on the rubberized rollers 43, or gears 41 that drive either the roller chain, or the wheels of the mobile housing.

The inversion of the direction of displacement of the roller chain 8, and thus of the thermal barrier 6, as well as the displacement of the mobile housing towards the front or to the back, is preferably obtained by inverting the polarities of the back geared motor 40 fed by direct current, for example by means of an incorporated battery and charger.

The roller chain 8 can advantageously be constituted of articulated links 44, preferably made of a plastic material, that get nested into one another, as can be seen from FIG. 14.

The mobile housing of FIG. 15 comprises an outer body 45 that can get detached so as to facilitate the cleaning of the internal elements of the device, and to enable the assembly and disassembly of the thermal barrier 6 and the roller chain 8. To this end, the body is mounted on slides that enable it to slide laterally, and comprises retractable crutches 46 that are intended to maintain it at its normal level when it is detached.

However, the shapes, sizes, arrangements as well as the means for implementing the embodiment that has just been described can vary within the scope of their equivalents.

I claim:

1. A mobile device forming an enclosure for food preservation and reheating, with movable thermal barriers and constant level distribution, of hot and cold meal-trays, said device comprising:

a mobile distributing column of the meal-trays comprising a flexible and movable thermal barrier that bears the trays while elevating them up to a distribution opening of the enclosure, while thermally separating a cold zone from a hot zone, said thermal barrier being mounted within said mobile device and moved along a path by means of a roller chain connected to said thermal barrier and driven by pulleys actuated by a driving mechanism mounted on said mobile device.

2. A device as defined by claim 1, wherein said driving mechanism comprises a pedal crank gear mechanism.

3. A device as defined by claim 1, wherein said driving mechanism comprises a motor.

4. A device as defined by claim 1, wherein the roller chain is affixed to the thermal barrier and articulated at the same level as an opening of the thermal barrier so as to allow the movement of the entire distributing column.

5. A device as defined by claim 1, wherein the trays are introduced through a distribution door into lateral openings of the thermal barrier and are stabilized and balanced by catches fixed on said thermal barrier, each said tray comprising over its entire lateral width, an abutment that is pressed against an opening by a magnetized portion of the thermal barrier.

6. A device as defined by claim 5, wherein said abutment is part of a gripping system.

7. A device as defined by claim 5, wherein said abutment is constituted by a solenoid.

8. A device as defined by claim 1, wherein under the lowermost tray, the thermal barrier is extended by a hermetic curtain also comprising the roller chain, said hermetic curtain being detachably clipped to the thermal barrier so as to continue to separate the cold zone from the hot zone when the thermal barrier is moved upwardly.

9. A device as defined by claim 1, wherein a compression springs, supported on the thermal barrier, between the thermal barrier and respective ones of the trays, cause partial ejection of the trays through a distribution opening.

10. A device as defined by claim 1, wherein the trays are distributed through one or more frontal distribution openings.

11. A device as defined by claim 1, wherein the trays are distributed through one or more lateral distribution openings.

12. A device as defined by claim 3, wherein the mobile device includes a plurality of wheels for ensuring displacement of the device, and wherein the motor is a back geared motor having two functions, said two functions comprising (1) driving the roller chain and (2) driving the wheels, said functions be selectively activated by means of a manual belt clutch to drive either the roller chain or the wheels of the mobile device.

13. A device as defined by claim 3, wherein the mobile device includes a plurality of wheels for ensuring displacement of the device, and wherein the motor is a back geared motor being displaceable between two positions, said motor having two functions, said two functions comprising (1) driving the roller chain and (2) driving the wheels, said functions be selectively activated by means of displacement of said motor between a first of said two positions, whereby said motor drives the roller chain, and a second of said two positions, whereby said motor drives the wheels of the mobile device.

14. A device as defined by claim 13, wherein respective rubberized rollers are provided for driving said roller chain and said wheels, and wherein said motor selectively drives one of said rubberized rollers for selectively driving either said roller chain or said wheels.

15. A device as defined by claim 13, wherein respective gears are provided for driving said roller chain and said wheels, and wherein said motor selectively drives one of said gears for selectively driving either said roller chain or said wheels.

16. A device as defined by claim 1, wherein the enclosure comprises an outer body mounted on slides enabling said outer body to slide laterally to reveal internal elements of the mobile housing to facilitate their cleaning and enable their assembly and disassembly, said outer body being equipped with retractable crutches attached to a bottom thereof to maintain said outer body at a normal level upon detachment of said outer body from said enclosure.

17. A device as defined by claim 1, wherein the roller chain comprises articulated links that are nestable into one another.

* * * * *